United States Patent [19]
Asghar et al.

[11] Patent Number: 6,003,003
[45] Date of Patent: Dec. 14, 1999

[54] SPEECH RECOGNITION SYSTEM HAVING A QUANTIZER USING A SINGLE ROBUST CODEBOOK DESIGNED AT MULTIPLE SIGNAL TO NOISE RATIOS

[75] Inventors: Safdar M. Asghar; Lin Cong, both of Austin, Tex.

[73] Assignee: Advanced Micro Devices, Inc., Sunnyvale, Calif.

[21] Appl. No.: 08/883,979

[22] Filed: Jun. 27, 1997

[51] Int. Cl.⁶ ........................................... G10L 7/08
[52] U.S. Cl. ............................. 704/243; 704/256
[58] Field of Search .................. 704/221, 222, 704/227, 226, 231, 233, 243, 244, 256

[56] References Cited

U.S. PATENT DOCUMENTS

| | | | |
|---|---|---|---|
| 4,933,973 | 6/1990 | Porter | 704/233 |
| 5,031,217 | 7/1991 | Nishimura | 381/43 |
| 5,046,099 | 9/1991 | Nishimura | 704/256 |
| 5,185,848 | 2/1993 | Aritsuka et al. | 704/202 |
| 5,414,796 | 5/1995 | Jacobs et al. | 395/2.3 |
| 5,583,888 | 12/1996 | Ono | 375/240 |

OTHER PUBLICATIONS

C. S. Xydeas and Lin Cong, "Robust Speech Recognition using Fuzzy Matrix Quantization, Neural Networks and Hidden Markov Models," Proc. of EUSIPCO–96, Eighth Eur. Sig. Proc. Conf.: Theor and Appl of Sig Proc, v3, p. 1587–90, Trieste, Italy (Sep. 10–13, 1996).

C. S. Xydeas and Lin Cong, "Robust Speech Recognition using Fuzzy Matrix Quantization and Neural Networks," Proceedings of International Conference on Communication Technology, Beijing, China—ICCT '96, pp. 432–435, IEEE, New York (May 5–7, 1996).

Thomas W. Parson, "Voice and Speech Processing," McGraw–Hill, Inc., New York, 1987, pp. 170–171.

Cong, Lin; "A Study of Robust IWSR Systems"; PhD Thesis submitted to The University of Manchester School of Engineering, Division of Electrical Engineering; Manchester, United Kingdom; pp. 1–209. May 1996.

Waibel, Alexander; "Neural Network Approaches for Speech Recognition"; Chapter 18 of *Advances in Speech Signal Processing;* edited by Sadaoki Furui and M. Mohan Sondhi; Marcel Dekker, Inc.; New York, New York; 1992; pp. 555–595.

Xydeas, C. S. and Cong, L.; "Combining Neural Network Classification with Fuzzy Vector Quantization and Hidden Markov Models for Robust Isolated Word Speech Recognition"; *Signal Processing VIII Theories and Applications,* vol. III; Proceedings of the IEEE International Symposium on Information Theory, IEEE Press, 1995, p. 174.

(List continued on next page.)

*Primary Examiner*—David R. Hudspeth
*Assistant Examiner*—Donald L. Storm
*Attorney, Agent, or Firm*—Skjerven, Morrill, MacPherson, Franklin & Friel L.L.P.; Kent B. Chambers

[57] ABSTRACT

In one embodiment, a speech recognition system is organized with a fuzzy matrix quantizer with a single codebook representing u codewords. The single codebook is designed with entries from u codebooks which are designed with respective words at multiple signal to noise ratio levels. Such entries are, in one embodiment, centroids of clustered training data. The training data is, in one embodiment, derived from line spectral frequency pairs representing respective speech input signals at various signal to noise ratios. The single codebook trained in this manner provides a codebook for a robust front end speech processor, such as the fuzzy matrix quantizer, for training a speech classifier such as a u hidden Markov models and a speech post classifier such as a neural network. In one embodiment, a fuzzy Viterbi algorithm is used with the hidden Markov models to describe the speech input signal probabilistically.

29 Claims, 6 Drawing Sheets

OTHER PUBLICATIONS

Xydeas, C.S. and Cong, L.; "Robust Speech Recognition in A Car Environment"; Presented at DSP95 International Conference on Digital Signal Processing, Jun. 26–28, 1995, Limassol, Cyprus; vol. 1, pp. 84–89.

Cong, Lin, Prof. C.S. Xydeas, and Anthony Ferwood; "A Study of Robust Isolated Word Speech Recognition Based on Fuzzy Methods"; Presented at EUSIPCO–94, VII European Signal Processing Conference, Sep. 13–16, 1994; Scotland, UK.; 4 pages.

Gibson, Jerry D.; "Coding, Transmission, and Storage"; Chapter 14, Speech Signal Processing, of *The Electrical Engineering Handbook;* Editor–in–Chief Richard C. Dor; ©1993 by CRC Press, Inc.; pp. 2779–314.

Gersho, Allen and Shihua Wang; "Vector Quantization Techniques in Speech Coding"; Chapter 2 of *Advances in Speech Signal Processing;* edited by Sadaoki Furui and M. Mohan Sondhi; Marcel Dekker, Inc.; New York, New York; 1992; pp. 49–84.

Kroon, Peter and Bishnu S. Atal; "Predictive Coding of Speech Using Analysis–by–Synthesis Techniques"; Chapter 5 of *Advances in Speech Signal Processing;* edited by Sadaoki Furui and M. Mohan Sondhi; Marcel Dekker, Inc.; New York, New York; 1992; pp. 141–164.

Honda, Masaaki and Yoshinao Shiraki; "Very Low–Bit–Rate Speech Coding"; Chapter 7 of *Advances in Speech Signal Processing;* edited by Sadaoki Furui and M. Mohan Sondhi; Marcel Dekker, Inc.; New York, New York; 1992; pp. 209–230.

Schroeter, Juergen and M. Mohan Sondhi; "Speech Coding Based on Physiological Models of Speech Production"; Chapter 8 of *Advances in Speech Signal Processing;* edited by Sadaoki Furui and M. Mohan Sondhi; Marcel Dekker, Inc.; New York, New York; 1992; pp. 231–268.

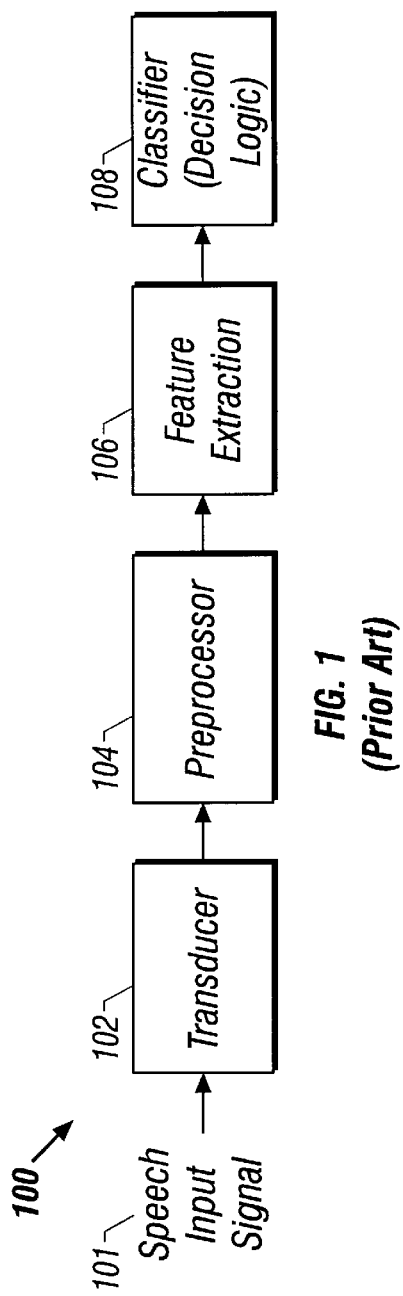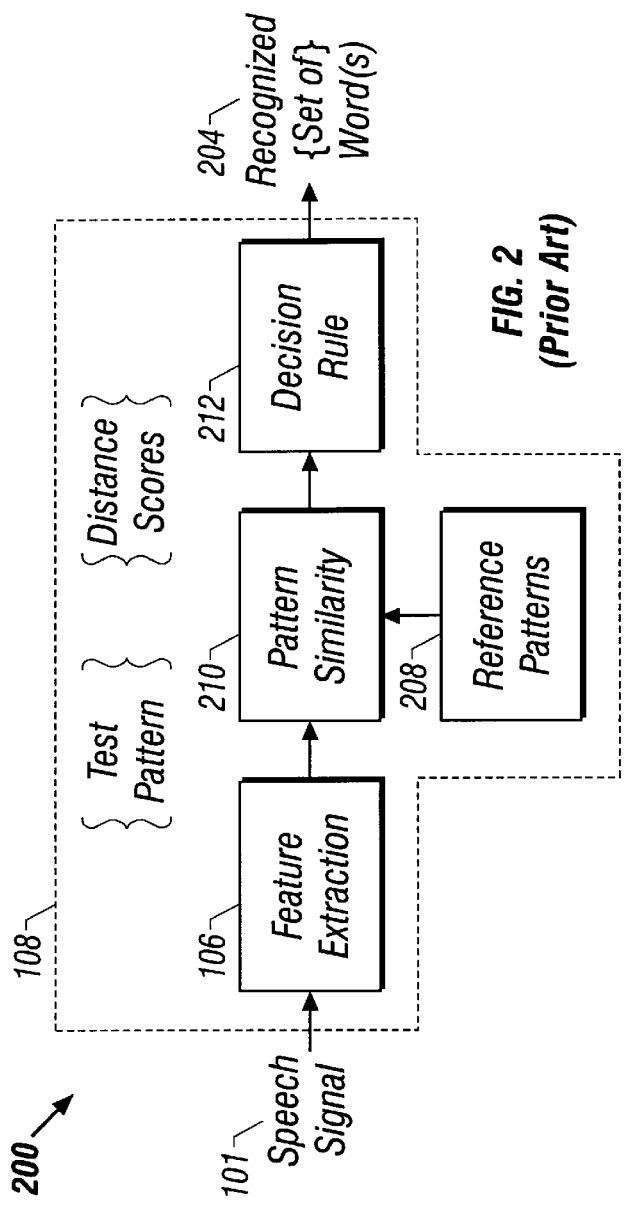

SPEECH RECOGNITION SYSTEM HAVING A QUANTIZER USING A SINGLE ROBUST CODEBOOK DESIGNED AT MULTIPLE SIGNAL TO NOISE RATIOS

BACKGROUND OF THE INVENTION

1. Field of the Invention

This invention relates to speech recognition systems and more particularly to speech recognition systems having a speech input signal quantizer with a single, robust codebook front end to one or more speech classifiers.

2. Description of the Related Art

Speech is perhaps the most important communication method available to mankind. It is also a natural method for man-machine communication. Man-machine communication by voice offers a whole new range of information/communication services which can extend man's capabilities, serve his social needs, and increase his productivity. Speech recognition is a key element in establishing man-machine communication by voice, and, as such, speech recognition is an important technology with tremendous potential for widespread use in the future.

Voice communication between man and machine benefits from an efficient speech recognition interface. Speech recognition interfaces are commonly implemented as Speaker-Dependent (SD)/Speaker-Independent (SI) Isolated Word Speech Recognition (IWSR)/continuous speech recognition (CSR) systems. The SD/SI IWSR/CSR system provides, for example, a beneficial voice command interface for hands free telephone dialing and interaction with voice store and forwarding systems. Such technology is particularly useful in an automotive environment for safety purposes.

However, to be useful, speech recognition must generally be very accurate in correctly recognizing (classifying) the speech input signal with a satisfactory probability of accuracy. Difficulty in correct recognition arises particularly when operating in an acoustically noisy environment. Recognition accuracy may be severely and unfavorably impacted under realistic environmental conditions where speech is corrupted by various levels of acoustic noise.

FIG. 1 generally characterizes a speech recognition process by the speech recognition system 100. A microphone transducer 102 picks up a speech input signal and provides to signal preprocessor 104 an electronic signal representation of the speech input signal 101. The speech input signal 101 is an acoustic waveform of a spoken input, typically a word, or a connecting string of words. The signal hi preprocessor 104 may, for example, filter the speech input signal 101, and a feature extractor 106 extracts selected information from the speech input signal 101 to characterize the signal with, for example, cepstral frequencies or line spectral pair frequencies (LSPs).

Referring to FIG. 2, more specifically, feature extraction in operation 106 is basically a data-reduction technique whereby a large number of data points (in this case samples of the speech input signal 101 recorded at an appropriate sampling rate) are transformed into a smaller set of features which are "equivalent", in the sense that they faithfully describe the salient properties of the speech input signal 101. Feature extraction is generally based on a speech production model which typically assumes that the vocal tract of a speaker can be represented as the concatenation of lossless acoustic tubes (not shown) which, when excited by excitation signals, produces a speech signal. Samples of the speech waveform are assumed to be the output of a time-varying filter that approximates the transmission properties of the vocal tract. It is reasonable to assume that the filter has fixed characteristics over a time interval of the order of 10 to 30 milliseconds (ms). Thus, a short-time speech input signal portion of speech input signal 101 may be represented by a linear, time-invariant all pole filter designed to model the spectral envelope of the signal in each time frame. The filter may be characterized within a given interval by an impulse response and a set of coefficients.

Feature extraction in operation 106 using linear predictive (LP) speech production models has become the predominant technique for estimating basic speech parameters such as pitch, formants, spectra, and vocal tract area functions. The LP model allows for linear predictive analysis which basically approximates a speech input signal 101 as a linear combination of past speech samples. By minimizing the sum of the squared differences (over a finite interval) between actual speech samples and the linearly predicted ones, a unique set of prediction filter coefficients can be determined. The predictor coefficients are weighting coefficients used in the linear combination of past speech samples. The LP coefficients are generally updated very slowly with time, for example, every 10–30 ms, to represent the changing vocal tract. LP prediction coefficients are calculated using a variety of well-known procedures, such as autocorrelation and covariance procedures, to minimize the difference between the actual speech input signal 101 and a predicted speech input signal 101 often stored as a spectral envelope reference pattern. The LP prediction coefficients can be easily transformed into several different representations including cepstral coefficients and line spectrum pair (LSP) frequencies. Details of LSP theory can be found in N. Sugamura, "Speech Analysis and Synthesis Methods Developed at ECL in NTT-from LPC to LSP", Speech Communication 5, Elsevier Science Publishers, B. V., pp. 199–215 (1986).

Final decision-logic classifier 108 utilizes the extracted information to classify the represented speech input signal to a database of representative speech input signals. Speech recognition classifying problems can be treated as a classical pattern recognition problem. Fundamental ideas from signal processing, information theory, and computer science can be utilized to facilitate isolated word recognition and simple connected-word sequences recognition.

FIG. 2 illustrates a more specific speech recognition system 200 based on pattern recognition as used in many IWSR type systems. The extracted features representing speech input signal 101 are segmented into short-term speech input signal frames and considered to be stationary within each frame for 10 to 30 msec duration. The extracted features may be represented by a P-dimensional vector and compared with predetermined, stored reference patterns 208 by the pattern similarity operation 210. Similarity between the speech input signal 101 pattern and the stored reference patterns 208 is determined in pattern similarity operation 210 using well-known vector quantization processes. The vector quantization process yields spectral distortion or distance measures to quantify the score of fitness or closeness between the representation of speech input signal 101 and each of the stored reference patterns 208.

Several types of spectral distance measures have been studied in conjunction with speech recognition including LSP based distance measures such as the LSP Euclidean distance measure (DLSP) and weighted LSP Euclidean distance measure (dWLSP). They are defined by $$dLSP = \sum_{i=1}^{P} (f_R(i) - f_S(i))^2$$

and $$dWLSP = \sum_{i=1}^{P} w(i)(f_R(i) - f_S(i))^2$$

where, $f_R(i)$ and $f_S(i)$ are the ith LSPs of the reference and speech vectors, respectively. The factor "w(i)" is the weight assigned to the ith LSP and P is the order of LPC filter. The weight factor w(i) is defined as:

$$w(i) = [P(f_S(i))]^r$$

where P(f) is the LPC power spectrum associated with the speech vector as a function of frequency, f, and r is an empirical constant which controls the relative weights given to different LSPs. In the weighted Euclidean distance measure, the weight assigned to a given LSP is proportional to the value of LPC power spectrum at this LSP frequency.

The decision rule operation 212 receives the distance measures and determines which of the reference patterns 208 the speech input signal 101 most closely represents. In a "hard" decision making process, speech input signal 101 is matched to one of the reference patterns 208. This one-to-one "hard decision" ignores the relationship of the speech input signal 101 to all the other reference patterns 208. Fuzzy methods have been introduced to provide a better match between vector quantized frames of speech input signal 101 and reference patterns 208. In a "soft" or "fuzzy" decision making process, speech input signal 101 is related to one or more reference patterns 208 by weighting coefficients.

Matrix quantization has also been used to introduce temporal information about speech input signal 101 into decision rule operation 212. Fuzzy analysis methods have also been incorporated into matrix quantization processes, as described in Xydeas and Cong, "Robust Speech Recognition In a Car Environment", Proceeding of the DSP95 International Conference on Digital Signal Processing, Jun. 26–28, 1995, Limassol, Cyprus. Fuzzy matrix quantization allows for "soft" decision using interframe information related to the "evolution" of the short-term spectral envelopes of speech input signal 101. Large reference codeword databases generally offer improved recognition accuracy over conventional speech recognition systems and also increase the amount of data processing time required by a speech recognition system. Thus, implementation of such a speech recognition system with satisfactory speech recognition accuracy can require high performance processing capabilities with a significant amount of database memory for storing reference codebooks. The cost of such speech recognition systems may limit availability to certain consumer markets such as the automotive voice communication market. Reducing the database size may increase processing speech while reducing performance.

Accordingly, a need exists to provide satisfactory robust speech recognition accuracy while using less processing and memory resources.

SUMMARY OF THE INVENTION

In one embodiment, speech recognition accuracy over a wide range of SNR levels may be achieved using a robust single codebook design in a speech recognition system while reducing processing and memory requirements. The single codebook is designed with entries from u codebooks which are designed with respective words at multiple signal to noise ratio levels to provide robustness in a variety of signal to noise ratio environments. In one embodiment, hidden Markov models and neural network classifiers are trained using a single fuzzy matrix codebook designed from u fuzzy matrix codebooks, where the speech recognition system has u vocabulary words. The number of codeword entries in the single codebook are flexible to accommodate processing and memory resource constraints.

In another embodiment of the present invention, a speech recognition system includes a first quantizer to receive a representation of the speech input signal and generate quantization output data representing the closeness of the represented speech input signal to codewords in a single codebook, the single codebook of the quantizer representing a vocabulary of u words, where u is a non-negative integer. The speech recognition system further includes a speech signal processor to receive the quantization output data from the quantizer, the speech signal processor having processes trained with respective quantization output data for one of the u vocabulary words and having input signal classifying output data.

In another embodiment of the present invention, a method includes the steps of designing a single codebook having a vocabulary of u words, each word being represented by codewords designed with test speech input signals corrupted by s signal to noise ratios, where u and s are non-negative integers. The method further includes the steps of generating a respective response by the designed single codebook to each of the test speech input signals corrupted by the s signal to noise ratios and training a hidden Markov model for each of the u words with each of the responses generated by the single codebook.

In another embodiment the method further includes the steps of receiving a speech input signal representation, generating a response by the designed single codebook to the speech input signal representation, and computing, for each of the u hidden Markov models, respective probabilities of the hidden Markov model accurately classifying the speech input signal as one of the u vocabulary words.

BRIEF DESCRIPTION OF THE DRAWINGS

Features appearing in multiple figures with the same reference numeral are the same unless otherwise indicated.

FIG. 1, labeled prior art, illustrates a general speech recognition system.

FIG. 2 illustrates a pattern-recognition based speech recognition system.

DETAILED DESCRIPTION OF THE PREFERRED EMBODIMENTS

Figure 3A:
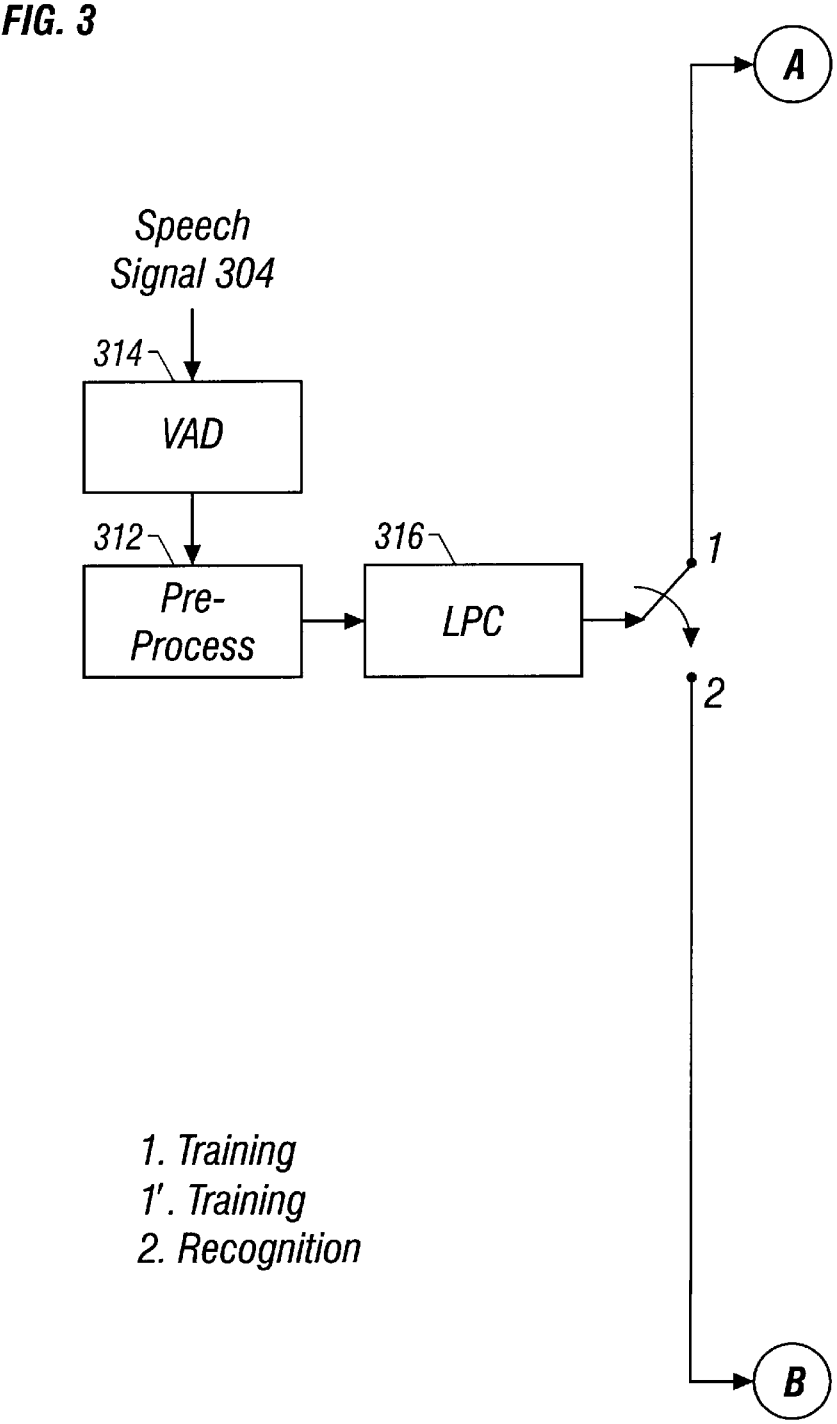
FIG. 3 illustrates an FMQ/HMM/MLP speech recognition system.
Figure 3B:
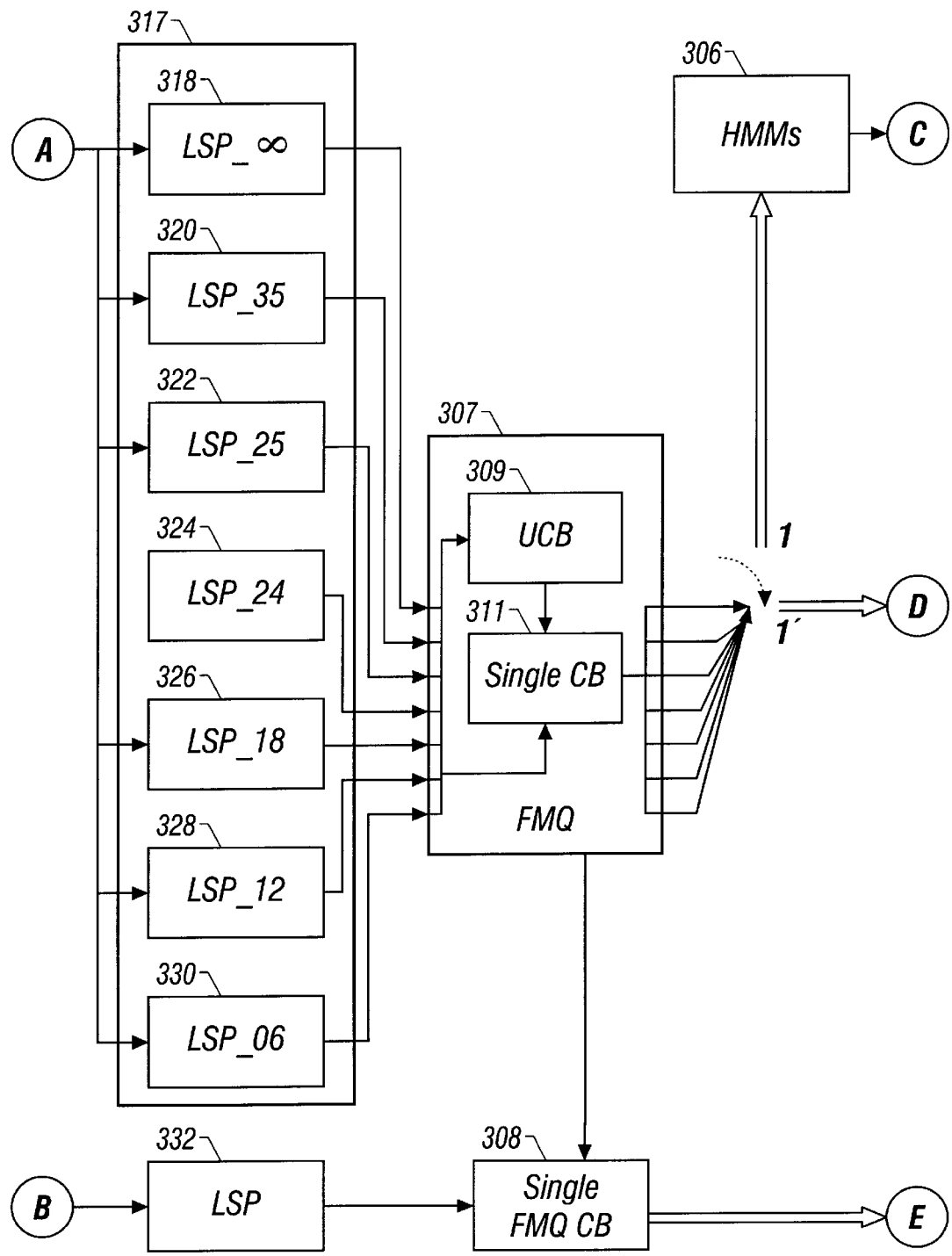
Figure 3C:
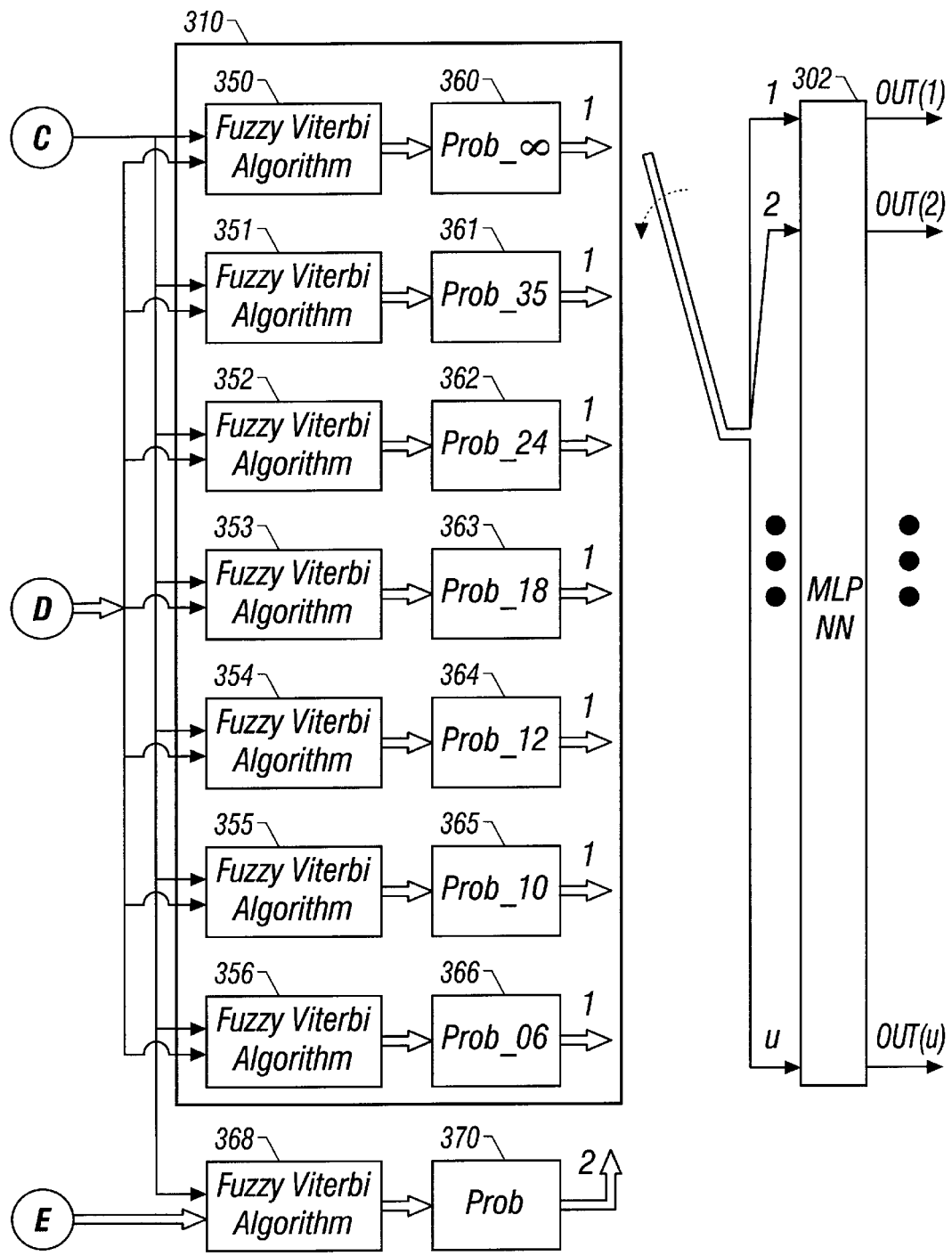
Figure 3D:
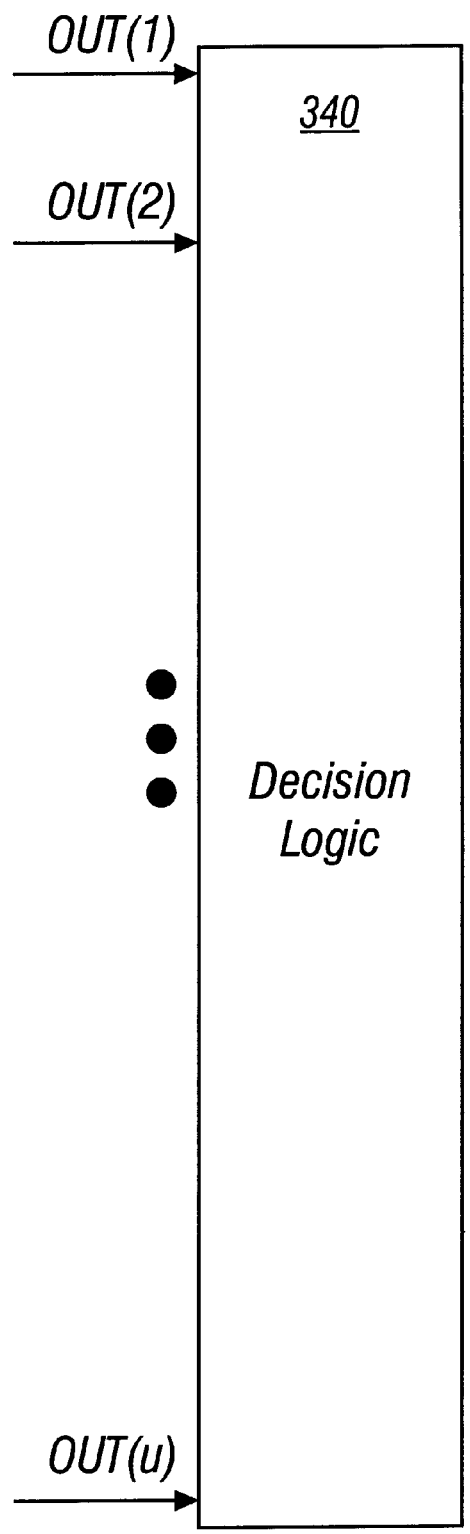

The following description of the invention is intended to be illustrative only and not limiting.

This description uses the following abbreviations:

FMQ—Fuzzy Matrix Quantization
FVQ—Fuzzy Vector Quantization
MQ—Matrix Quantization
HMM—Hidden Markov Model
$\lambda$—a HMM process
$Pr(O|\lambda)$—Probability of model/process $\lambda$ producing observation O
NN—Neural network
MLP—Multilevel Perceptron neural network
LSP—Line Spectral Pair
dB—decibel
FD—fuzzy distance measure
IWSR—Isolated Word Speech Recognition
SNR—Signal to Noise Ratio Referring to an embodiment of a speech recognition system in FIG. 3, IWSR speech recognition system 300 combines the classification power of speech classifier neural network 302 with temporal distortion and probability information derived from frames of input speech signal 304 with at least one speech preprocessor to classify speech signal 304. In preparation for IWSR, speech recognition system 300 undergoes a training process of designing FMQ 307 codebooks and preclassifier robust FMQ 308 codebook and training u hidden Markov models in preclassifier HMMs 306 and neural network 302. A data base of u words repeated r times and corrupted by s different levels of acoustic noise is used during the training process, where u corresponds to the vocabulary of speech recognition system 300, and s and r are positive integers, for example, seven and thirty, respectively.

Speech recognition system 300 is designed to classify an input speech signal 304 word as one of u predetermined vocabulary words. FMQ 308, with a single cadebook for u words, is a front end to HMMs 306, and speech recognition system 300 uses an observation sequence $O_n$ of probability mass vectors from FMQ 308 to respectively train the HMMs 306. Signal modeling based on HMMs 306 can be considered as a technique that extends conventional stationary spectral analysis principles to the analysis of the quantized time-varying speech input signal 304. The time-varying quantized properties of speech input signal 304 are used by processes $\lambda_n$ of HMMs 306 and Viterbi algorithm 310 to describe speech signal 304 probabilistically. Maximum likelihood probabilities $Pr(O_n|\lambda_n)$ 360–366 calculated at seven respective SNR levels with a Viterbi algorithm serve respective as input data to respective nodes of MLP neural network 302.

Initially during training, for each of u vocabulary words, u codebooks 309 in FMQ 307 are respectively designed using the nth word of u vocabulary words repeated r times at s SNR levels. Thus, a total training database has u times r times s (urs) entries. Each of the usr words in the database is input to speech recognition system 300 as speech input signal 304 and preprocessed by preprocess operation 312 which, for example, band limits speech signal 304 to 3.6 kHz and samples speech signal 304 at 8 ksamples/sec with a resolution of 16 bits per sample. During speech recognition, when continuous speech is produced, voice activity detector (VAD) 314 effectively defines end points of input words for IWSR. A P order linear predictive code (LPC) analysis is performed in LPC operation 316 on a 20 msec frame of speech signal 304 with a 10 msec overlap between frames to compute the LPC coefficients for the speech signal 304 frame using, for example, the Burg algorithm. P may vary depending on trade offs between desired resolution and processing speed and in this embodiment, P is assumed to be in the range often to sixteen. Frame times may vary and are, in general, chosen to represent an approximately static vocal tract period in a range of, for example, 10–30 msec. The training process follows the path through path position 1-1', to LSP operation 317 where line spectral pair frequencies are derived in a well-known manner from the respective LPC coefficients. LSP_(SNR) operations 318, 320, 322, 324, 326, 328, and 330 indicate that line spectral pair frequencies (coefficients) are generated by LSP operation 317 for each speech signal 304 frame for all seven SNR levels from the LPC coefficients.

In the embodiment of FIG. 3, the respective SNR levels used to train speech recognition system 300 are clean speech ($\infty$), 35 dB, 25 dB, 24 dB, 18 dB, 12 dB, and 6 dB to model various noises in an automotive environment. Other SNR values may be chosen to model other speech environments or more extensively model the automotive environment. Speech recognition system 300 is designed for robustness by training with multiple acoustic noise SNR corruption levels to better model realistic speech signal 304 input conditions where speech is corrupted by acoustic noise.

The LSP representations of speech signal 304 are used to define a spectral envelope because they provide a robust representation of the speech short-term magnitude spectral envelope of speech signal 304. Band limited input distortion affects only a subset of LSP coefficients, as compared to the case of a cepstral representation where input noise corrupts all the coefficients. Additionally, LSP parameters have both well-behaved dynamic range and filter stability preservation properties and can be coded more efficiently than other parameters. As a result, the LSP representation can lead to a 25–30% bit-rate reduction in coding the filter (vocal tract) information, as compared to the cepstral coefficient representation. Furthermore, spectral LSP sensitivities are localized, i.e., a change in a given LSP produces a change in the LP power spectrum only in its neighborhood frequencies. For example, a change in an LSP from 1285 Hz to 1310 Hz affects the LP power spectrum near 1300 Hz. This is particularly useful when speech is corrupted by narrow band noise in which case only a subset of LSP parameters are affected by the input noise.

In general given a short segment of speech signal 304 and the corresponding all-pole filter $H(z)=G/A(z)$, where $A(z)$ is the inverse filter given by $$A(z)=1+a_1z^{-1}+a_2z^{-2}+\ldots+a_P z^{-P}$$

where P is the order of the predictor and $\{a_i\}$ are the prediction coefficients, the LSPs are defined by decomposing the inverse filter polynomial into two polynomials, $$P(z)=A(z)+z^{-(P+1)}A(z-1),$$

and $$Q(z)=A(z)-z^{-(P+1)}A(z-1),$$

where P(z) is a symmetric polynomial, Q(z) is an anti-symmetric polynomial and $$A(z)=\tfrac{1}{2}[P(z)+Q(z)].$$

The roots of the polynomials P(z) and Q(z) define the LSP frequencies (coefficients).

Each of the u codebooks 309 for a given vocabulary word is designed by developing a matrix entry from each corresponding input word $W_{nkm}$, n=1, 2, ... u, k=1, 2, ..., s, m=1, 2, ..., r, from the database of usr words. The sr matrix entries for each of the u words at each of the s SNR levels are processed to optimally cluster each of the sr entries for each of the u codebooks 309 into C cells. A centroid is computed for each of the C cells for each of the u codebooks 309 for minimum quantization distortion using, for example, a Fuzzy C-algorithm or a fuzzy Linde-Buzo-Gray (LBG) algorithm as illustratively discussed in chapter 3, section 3.3.4 of the Doctor of Philosophy thesis of Lin Cong entitled "A Study of Robust IWSR Systems" and located in the John Rylands University Library of Manchester in Manchester, England, which thesis is hereby incorporated by reference in its entirety, and further illustratively discussed in C. S. Xydeas and Lin Cong, "Robust Speech Recognition Using Fuzzy Matrix Quantisation, Neural Networks and Hidden Markov Models", pp. 1587–1590, EUSIPCO-96, Vol. 1, September, 1996, which is also incorporated by reference in its entirety. Thus, u matrix codebooks (MCBn) 309 in FMQ 307 are formed.

Each of the u codebooks 309 are used to design a single codebook 311 by combining the C centroids of each of the u codebooks 309 into u times C centroids of the single codebook 311. The individual centroids are preferably unaltered after combining. Cu may be chosen to accommodate available speech recognition system 300 resources and is, for example, equal to the training vocabulary word size times 16.

Figure 4:
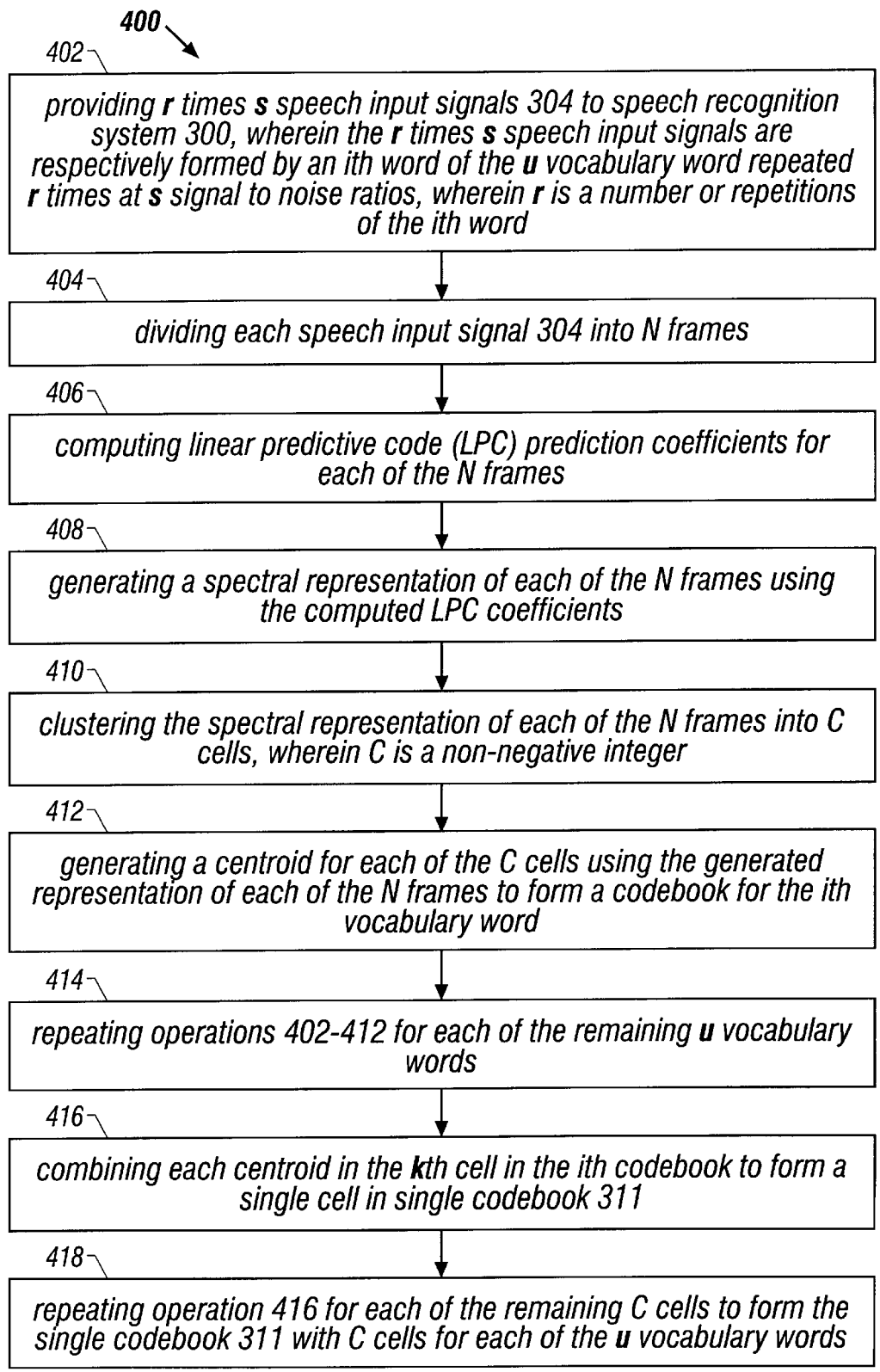
FIG. 4 illustrated one embodiment of a process of designing a single codebook.

FIG. 4 illustrates one embodiment of a single codebook design process 400 for designing single codebook 311. The single codebook 311 is designed to have a vocabulary of u words, each word being represented by codewords designed with test speech input signals 304 corrupted by s signal to noise ratios. The single codebook design process 400 initiates in operation 402 by providing r times s word input signals to speech recognition system 300, wherein the r times s word speech input signals 304 are respectively formed by an ith word of the u vocabulary words repeated r times at s signal to noise ratios, wherein r is a number of repetitions of the ith vocabulary word. The single codebook design process 400 continues in operation 404 by dividing each word input signal into N frames and, in operation 406, by computing linear predictive code (LPC) prediction coefficients for each of the N frames. The single codebook design process 400 further continues by: (i) generating a spectral representation of each of the N frames using the computed LPC coefficients in operation 408; (ii) clustering the spectral representation of each of the N frames into C cells, wherein C is a non-negative integer in operation 410; (iii) generating a centroid for each of the C cells using the generated representation of each of the N frames to form a codebook for the ith vocabulary word in operation 412; and (iv) in operation 414, repeating operations 402–412 for each of the remaining u vocabulary words. The single codebook design process 400 concludes by combining each centroid in the kth cell in the ith codebook to form a single cell in a single codebook in operation 416 and, in operation 418, repeating operation 416 for each of the remaining C cells to form the single codebook with C cells for each of the u vocabulary words.

FMQ 307 utilizes interframe information related to the "evolution" of the speech short-term spectral envelopes of speech signal 304 by operating on N consecutive speech frames of speech signal 304. Each frame is represented by P LSP coefficients, and, thus, an N frames speech input signal segment provides a P×N matrix of LSP coefficients. Each matrix entry for a speech signal 304 input word $W_{nkm}$ may be designed using a training set of TO speech spectral vectors for each of TO frames of each speech signal 304 word $W_{nkm}$, which result in a set $X=\{x_1, x_2, \ldots, x_T\}$ of T, P×N matrices for each speech signal 304 word $W_{nkm}$, where T=int(TO/N)

$$x_k = \begin{bmatrix} x_{11}^k & x_{12}^k & \cdots & x_{1N}^k \\ x_{21}^k & x_{22}^k & \cdots & x_{2N}^k \\ \cdots & \cdots & \cdots & \cdots \\ x_{P1}^k & x_{P2}^k & \cdots & x_{PN}^k \end{bmatrix} = [\bar{x}_k(1), \bar{x}_k(2), \ldots, \bar{x}_k(N)],$$

where the $\bar{x}k(j)=[x_{1j}^k x_{2j}^k \ldots x_{Pj}^k]'$, $j=1,2,\ldots,N$, $k=1,2,\ldots,T$ for each word $W_{nkm}$ is grouped by word to form rs entries in the corresponding nth FMQ 309 codebook. The $\bar{x}k(j)$ for each word entry in a codebook is processed using, for example, the LBG algorithm, to yield a C-cell partitioning of the matrix space for each codebook and V-matrix entries containing C $v_i$, i=1,2, ..., C, P×N, codeword matrices $$v_i = \begin{bmatrix} v_{11}^i & v_{12}^i & \cdots & v_{1N}^i \\ v_{21}^i & v_{22}^i & \cdots & v_{2N}^i \\ \cdots & \cdots & \cdots & \cdots \\ v_{P1}^i & v_{P2}^i & \cdots & v_{PN}^i \end{bmatrix} = [\bar{v}_i(1), \bar{v}_i(2), \ldots, \bar{v}_i(N)],$$

where $\bar{v}_i(j)=[v_{1j}^i, v_{2j}^i, \ldots, v_{Pj}^i]'$, $j=1,2,\ldots,N$.

Each of the C codeword matrices $v_i$ for each of the u codebooks 309 are combined as described above to form the single codebook 311 having C time u codeword matrices $v_i$, i=1, 2, ..., Cu, C codewords per vocabulary word.

Continuing the training process of speech recognition system 300, each of the training word $W_{nkm}$ entries in the urs training word database are provided as a respective training speech signal 304 to the single codebook 311. Each training speech signal 304 is preprocessed by preprocess operation 312, and LPC coefficients are determined in LPC operation 316 as described above. Each of the LPC coefficients are converted into respective line spectral pair frequencies by LSP operation 317. Each of the training words $W_{nkm}$ is represented by a respective set of the TO speech spectral vectors for each frame of each speech signal 304 word $W_{nkm}$, which result in a set $X=\{x_1, x_2, \ldots, x_T\}$ of T, P×N matrices for each speech signal 304 word $W_{nkm}$, where T=int(TO/N).

A non-fuzzy matrix quantization of X can be described by a Cu×T classification matrix U of elements:

$$u_{ik} = \begin{cases} 0, & x_k \notin A_i \quad i=1,2,\ldots,Cu \\ 1, & x_k \in A_i \quad k=1,2,\ldots,T. \end{cases}$$

Furthermore, the elements of this single codebook MQ matrix satisfy the following two conditions:

a)

$$\sum_{i=1}^{Cu} u_{ik} = 1,$$

i.e., only one element in a column is equal to one; the remaining elements are zero. This implies that each matrix $x_k$ is "quantized" to only one centroid of the matrix space.

b)

$$\sum_{k=1}^{T} u_{ik} > 0;$$

this ensures that there is no empty cell in this Cu-class partitioning of the matrix space.

The columns $O_j$, $j=1, 2, \ldots, T$, of the classification matrix U "map" effectively an input matrix $x_j$ into a vector $O_j = \{u_{1j}, u_{2j}, \ldots, u_{Cuj}\}$ with all zero values except one element $u_{ij}=1$ indicating that the distance $$J(O_j, V) = \sum_{i=1}^{Cu} u_{ij} d(x_j, v_i)$$

between $x_j$ and the ith cell is minimized. Note that each of the columns of relative closeness indices $O_j$, $j=1,2,\ldots,T$, represents the input signal 304 at different instances in time. $d(x_j, v_j)$ is the distance measure $$d(x_j, v) = \frac{1}{P} \sum_{m=1}^{P} d(\bar{x}_j(n), \bar{v}_i(n))$$

and, for example, the distance measure $$d(\bar{x}_j(n), \bar{v}_i(n)) = \sum_{m=1}^{P} (x_{mn}^j - v_{mn}^i)^2.$$

This distance measure is the distance between the jth column vector $x_j$ and $v_i$, which is the centroid of the ith cell. Note that for a non-fuzzy MQ codebook, an optimum partition of the matrix space of each of the u codebooks 309 into the C cells before combining the u codebooks 309 into single codebook 311 ensures that $$J(U, V) = \sum_{j=1}^{T} \sum_{i=1}^{Cu} u_{ij} d(x_j, v_i)$$

is minimized. Different distance measures utilize different quantization mechanisms for computing the "centroid" matrices $v_i$.

The fuzzy matrix quantization of each of the training words $W_{nkm}$ X, using the single codebook 311, is described by a Cu×T fuzzy classification matrix $U_F$ with elements $u_{ik} \in [0,1]$, $i=1,2,\ldots,Cu$, $k=1,2,\ldots,T$. The value of $u_{ik}$, $0 \leq u_{ik} \leq 1$, indicates the degree of fuzziness of the kth input matrix $x_k$ to the ith partitioning cell which is represented by the centroid $v_i$. The two conditions are also satisfied:

$$\sum_{i=1}^{Cu} u_{ik} = 1 \text{ and } \sum_{k=1}^{T} u_{ik} > 0$$

In this case, $u_{ik}$ is derived as:

$$u_{ik} = \frac{1}{\sum_{j=1}^{Cu} \left( \frac{d_{ik}(x_k, v_i)}{d_{jk}(x_k, v_j)} \right)^{\frac{1}{(F-1)}}}.$$

where the constant F influences the degree of fuzziness. $d_{ik}(x_k, v_j)$ are the average distance measures as defined with reference to the MQ design.

The columns of probability mass vectors $O_j$ of the classification matrix $U_F$ "map" an input matrix $x_j$ into a probability mass vector of indices $O_j = \{u_{1j}, u_{2j}, \ldots, u_{Cuj}\}$ which results in the distance $$J(O_j, V) = \sum_{i=1}^{Cu} u_{ij}^F d(x_j, v_i).$$

When using LSP based distance measures, $d(x_j, v_i)$ equals $$dLSP = \sum_{i=1}^{P} (f_R(i) - f_S(i))^2$$

or $$dWLSP = \sum_{i=1}^{P} w(i)(f_R(i) - f_S(i))^2$$

Additionally, $d(x_j, v_i)$ may be the robust distance measure described in a concurrently filed U.S. patent application Ser. No. 08/883,980, filing date Jun. 27, 1997, entitled "Robust Distance Measure in a Speech Recognition System" by Safdar M. Asghar and Lin Cong, which is incorporated herein in its entirety.

Furthermore, the overall distance of the Cu entries of FMQ 308 operating on the X matrix set or a speech signal 304 word $W_{nkm}$ is $J(U, V) =$ $$J(U, V) = \sum_{j=1}^{T} \sum_{i=1}^{Cu} u_{ij}^F d(x_j, v_i).$$

$d(x_j, v_i)$.

Note that the summation of $O_j$ entries is equal to unity. The largest component of $O_j$ is the one which corresponds to the codeword with the smallest $d(x_j, v_i)$ value. $O_j$ can be interpreted as a probability mass vector relating the input matrix $x_j$ to all $v_i$, $i=1,2,\ldots,Cu$. The total observation sequence $O_n$ of probability mass vectors for each speech signal 304 word for one codebook is defined as $O_n = \{O_1, O_2, \ldots, O_T\}$, $O_j = \{u_{1j}, u_{2j}, \ldots, u_{Cuj}\}$.

Equations $$J(U, V) = \sum_{j=1}^{T} \sum_{i=1}^{Cu} u_{ij} d(x_j, v_i)$$

and $$J(U, V) = \sum_{j=1}^{T} \sum_{i=1}^{Cu} u_{ij}^F d(x_j, v_i)$$

respectively provide the MQ and FMQ distance and can also be represented by the general distance equation:

$$FD = J(W, V) = \sum_{j=1}^{T} \sum_{i=1}^{Cu} w_{ij} d(x_j, v_i),$$

where $$w_{ij} = \begin{cases} u_{ij} & u_{ij} \in \{0, 1\} \\ u_{ij}^F & u_{ij} \in [0, 1] \end{cases}$$

Fuzzy matrix quantization is further illustratively discussed in Xydeas and Cong, "Robust Speech Recognition in a Car Environment," International Conf. on Digital Signal Processing, Vol. 1, pp. 84–89, June, 1995, Cyprus, which is herein incorporated by reference in its entirety.

During the training mode of speech recognition system 300, the training input data for the hidden Markov models of classifier HMMs 306 are in one embodiment the observation sequences $O_n$ of probability mass vectors $O_j$ from a classification matrix U. The classification matrix U is generated by FMQ 308 from a fuzzy matrix quantized speech input signal for each of the training words $W_{nkm}$ as described above. HMMs 306 have a respective process $\lambda_n$, n=1, 2, ..., u, for each of the u words. Each of the respective u vocabulary words for each repetition r and SNR levels s is, in one embodiment, fuzzy matrix quantized to train a corresponding HMM process $\lambda_n$. Each of the observation sequences $O_n$ from FMQ 308 for each of the urs training words train corresponding HMM processes, $\lambda_n$, n=1, 2, ..., u, i.e. for an nth vocabulary word, an input observation sequence $O_n$ trains only the nth HMM $\lambda_n$. Fuzzy Viterbi algorithm operation 310, described in section 4.3 of L. Cong, "A Study of Robust IWSR Systems" utilizes a respective observation sequence $O_n$ from each of the rs versions of each of the u words and a fuzzy Viterbi algorithm to produce a maximum likelihood probability $\Pr(O_n|\lambda_n)$ of the HMM process $\lambda_n$ producing the observation sequence $O_n$. Separate HMMs may be built for males and females, and the number of states of each HMM is set to, for example, five. HMM training is further described in chapter 2 and chapter 4, section 4.3 of L. Cong, "A Study of Robust IWSR Systems".

In one embodiment neural network 302 is a multilayer perceptron type NN. Multilayer networks overcome many of the limitations of single-layer networks. That is, multilayered, hierarchical networks are more powerful because of the nonlinearities and the internal representation generated in the so-called hidden layers. The multiple nodes in the output layer typically correspond to multiple classes in the multi-class pattern recognition problem. In general, an MLP neural network 302 has an ability to partition an input pattern space in a classification problem and to represent relationships between events. Additionally, MLP neural network 302 with multiple layers and sufficient interconnections between nodes ensures an ability to "learn" complex classification boundaries, and implement nonlinear transformations for functional approximation problems. The MLP has G hidden nodes where G is preferably determined empirically based upon the number of u vocabulary words, memory size, and processing capabilities.

The MLP neural network 302 is trained using the maximum likelihood probabilities produced by fuzzy Viterbi algorithm operation 310. The post-classifier MLP neural network 302 accepts the input data and is appropriately designed using the well-known back propagation algorithm. The MLP neural network 302 is trained for the nth vocabulary word, using the back propagation algorithm, with the s SNR values of each of the r single word versions. Multiple fuzzy Viterbi algorithms 350–356 with corresponding maximum likelihood probabilities 36–366 are shown to indicate that MLP neural network 302 is trained using words corrupted by acoustic noise of SNR levels ∞dB, 35 db, 24 dB, 18 dB, 12 dB, 10 dB, and 06 dB.

After training the speech recognition system 300, path 2 is selected to initiate a speech signal 304 recognition process. When any speech signal 304 word $W_n$ is spoken by a user, VAD 314 effectively defines end points of input words for IWSR. Speech input signal 304 word Wn is next preprocessed by preprocess operation 312 as described above. Word $W_n$ is sampled at, for example, 8 ksamples/sec, and segmented into TO frames, each frame t seconds, such as 20 msec with a 10 msec overlap of each consecutive frame, of $W_n$. LPC operation 316 generates P LPC coefficients for each frame of the $W_n$, and LSP operation 332 generates Pth order LSP coefficients from the LPC coefficients as described above.

FMQ 308 utilizes interframe information related to the "evolution" of the speech short-term spectral envelopes of speech signal 304 word $W_n$ by operating on N consecutive speech frames of word $W_n$. Since each frame is represented by the P order LSP coefficients, and N frames of speech input signal segment of word $W_n$ provide. Each of T of speech signal 304 word $W_n$ is represented by a P×N matrix of LSP coefficients, where T=int(TO/N). Word $W_n$ may, thus, be represented as a matrix $X_{W_n} = \{x_1, x_2, \ldots, x_T\}$ of T, P×N matrices for each speech signal 304 word $W_{nklm}$, where each of the T, P×N matrices is defined as:

$$x_k = \begin{bmatrix} x_{11}^k & x_{12}^k & \cdots & x_{1N}^k \\ x_{21}^k & x_{22}^k & \cdots & x_{2N}^k \\ \cdots & \cdots & \cdots & \cdots \\ x_{P1}^k & x_{P2}^k & \cdots & x_{PN}^k \end{bmatrix} = [\bar{x}_k(1), \bar{x}_k(2), \ldots, \bar{x}_k(N)],$$

where $\bar{x}k(j) = [x_{1j}^k x_{2j}^k \ldots x_{Pj}^k]'$, $j = 1, 2, \ldots, N, k = 1, 2, \ldots, T$.

FMQ 308 fuzzy matrix quantizes the matrix representation $X_{Wn} = \bar{x}k(j)$ of word $W_n$ with the designed Cu codeword entries of the single codebook 311. Single codebook FMQ 308 produces the fuzzy distance measure FD and yields an observation sequence $O_n$ of T probability mass vectors $O_j$, j=1, 2, ..., Cu. Observation sequence $O_n$ is used as input data by a fuzzy Viterbi algorithm 368 operating on each of the HMM $\lambda_n$ processes of HMMs 306. The u outputs of the fuzzy Viterbi algorithm 310 are the respective maximum likelihood probability Pr' $(O_n|\lambda_n)$ measures that each of the $\lambda_n$ processes corresponds to $W_n$.

These u respective maximum likelihood probability Pr' $(O_n|\lambda_n)$ measures are the input data for u input nodes of MLP neural network 302. The MLP neural network 302 has u outputs {OUT(1), OUT(2), . . . , OUT(u)} from u output nodes which assume classification values in the region 0<OUT(j)<1. Decision logic 340 classifies $W_n$ as the nth vocabulary word if OUT(i)=max{OUT(1), OUT(2), . . . , OUT(u)}.

Training the single codebook FMQ 308 with r versions of the u vocabulary words at the s SNR levels provides the foundation for a robust speech recognition system 300. Using fuzzy matrix quantization in single codebook FMQ 308, temporal relations between an input signal word and codewords designed using the entire vocabulary of u words. Furthermore, these relations provide robust input data to the u hidden Markov models HMMs 306 and Viterbi algorithms which further provide probabilities using additional temporal processes. The MLP neural network 302 adds a further measure of speech processing to arrive at a classification of the input word as one of the u vocabulary words. The organization of speech recognition system 300 with a single codebook design of FMQ 308 provides a compact and relatively high performance system of speech recognition with little, if any, compromise in speech recognition accuracy.

While the invention has been described with respect to the embodiments and variations set forth above, these embodiments and variations are illustrative and the invention is not to be considered limited in scope to these embodiments and variations. For example, the embodiment of speech recognition system 300. This powerful and general speech recognition system 300 can be further simplified to a robust HMM based IWSR structure by removing the MLP post-classifier from the system FMQ/HMM/MLP shown in FIG. 3 to form a MQ/HMM speech recognition system 300. Accordingly, various other embodiments and modifications and improvements not described herein may be within the spirit and scope of the present invention, as defined by the following claims.

What is claimed is:

1. A speech recognition system comprising:
   a first quantizer to receive a representation of a speech input signal and generate quantization output data representing the closeness of the represented speech input signal to codewords in a single codebook, the single codebook of the quantizer representing a vocabulary of u words, where u is a non-negative integer greater than one and the single codebook further having a mixture of s signal to noise ratio codeword entries; and
   a speech signal processor to receive the quantization output data from the quantizer, the speech signal processor having processes trained with respective quantization output data for the u vocabulary words and having speech input signal classifying output data as recognized speech.

2. The speech recognition system of claim 1 further comprising:
   a speech classifier to receive the speech input signal classifying output data and having output data to classify the speech input signal.

3. The speech recognition system of claim 2 wherein the speech classifier is a multilevel perceptron neural network trained solely with the speech input signal classifying output data from the speech signal processor.

4. The speech recognition system of claim 1 further comprising:
   a second quantizer having s times u codebooks, one codebook for each of the u vocabulary words at each of s signal to noise ratios, wherein each of the codebooks has C codeword entries, and the single codebook of the first quantizer has a mixture of each corresponding signal to noise ratio codeword entry from each of the s times u codebooks.

5. The speech recognition system of claim 4 wherein the mixture of each corresponding signal to noise ratio codeword entry from each of the s times u codebooks is determined by clustering corresponding signal to noise ratio C codeword entries from each of the s times u codebooks and determining u times C codeword entries.

6. The speech recognition system of claim 4 wherein the first quantizer is a fuzzy matrix quantizer.

7. The speech recognition system of claim 1 wherein the quantization output data are observation sequences of indices representing the closeness of the speech input signal to each codeword in the single codebook.

8. The speech recognition system of claim 1 wherein the speech signal processor comprises:
   a plurality of hidden Markov models each modeling a respective word in the vocabulary of u words, wherein the quantization output data representing the closeness of the speech input signal to the codewords is an observation sequence of indices produced by the speech signal processor; and
   a probability module to determine respective probabilities of each hidden Markov model producing the observation sequence representing the speech input signal.

9. The speech recognition system of claim 8 wherein the probability module includes a fuzzy Viterbi algorithm.

10. The speech recognition system of claim 1 wherein the speech input signal is represented by one set of P order line spectral pairs and N successive speech input signals represent a word.

11. The speech recognition system of claim 1 further comprising:
    a communication device having the first quantizer and speech signal processor.

12. The speech recognition system as in claim 1 wherein each word represented in the single codebook is designed with test speech input signals corrupted by s signal to noise ratios, where s is a non-negative integer and the speech signal processor includes u hidden Markov models.

13. The speech recognition system as in claim 12 wherein:
    the speech classifier further includes a Viterbi algorithm;
    the Viterbi algorithm and the u hidden Markov models are capable of generating probabilistic speech input signal classifying output data; and
    the speech recognition system further comprising:
        a neural network to utilize the probabilistic speech input signal classifying output data to: (i) train the neural network to recognize the speech input signal as speech and (ii) recognize the speech input signal as speech.

14. A speech recognition system comprising:
    a means for computing P order linear predictive code prediction coefficients to represent each a word input signal segmented into N frames, where P and N are a non-negative integers;
    means for deriving line spectral pair coefficients from the prediction coefficients;
    a fuzzy matrix quantizer for processing a P×N matrix of the line spectral pair coefficients and providing fuzzy matrix quantization data from a single codebook having a group of C codewords for each of u vocabulary words, wherein each of the u groups of C codewords is derived from s groups of C codewords designed at s signal to noise ratios, wherein s and C are a non-negative integers;
    a plurality of u hidden Markov models, respectively trained using the single codebook, for modeling respective speech processes and for producing respective output data in response to receipt of the quantization data;

a means for receiving the quantization data and the respective output data of the u hidden Markov models for determining a probability for each of the u hidden Markov models that the respective hidden Markov model produced the quantization data; and means for receiving the probabilities for training to classify the word input signal and for classifying the word input signal as one of the u vocabulary words.

15. The speech recognition system as in claim 14 wherein u is greater than 1.

16. A method comprising the steps of:

designing a single codebook having a vocabulary of u words, each word being represented by codewords designed with test speech input signals corrupted by s signal to noise ratios, where u and s are non-negative integers;

generating a respective response by the designed single codebook to each of the test speech input signals corrupted by the s signal to noise ratios; and training a hidden Markov model for each of the u words with each of the responses generated by the single codebook.

17. The method of claim 16 further comprising the steps of:

receiving a speech input signal representation;

generating a response by the designed single codebook to the speech input signal representation; and computing, for each of the u hidden Markov models, respective probabilities of the hidden Markov model classifying the speech input signal representation as one of the u vocabulary words.

18. The method of claim 17 further comprising the step of:

providing the respective probability from each of the hidden Markov models to a multilevel perceptron neural network to classify the speech input signal as one of the u vocabulary words.

19. The method of claim 17 further comprising the step of:

training a speech classifier with each of the respective probabilities of each of the hidden Markov models.

20. The method as in claim 19 wherein the speech classifier is a neural network.

21. The method of claim 16 wherein the step of designing the single codebook comprises the steps of:

a) providing r times s word input signals to a feature extractor, wherein the r times s word input signals are respectively formed by an ith word of the u vocabulary words repeated r times at s signal to noise ratios, wherein r is a number of repetitions of the ith word;

b) dividing each word input signal into N frames;

c) computing linear predictive code (LPC) prediction coefficients for each of the N frames;

d) generating a spectral representation of each of the N frames using the computed LPC coefficients;

e) clustering the spectral representation of each of the N frames into C cells, wherein C is a non-negative integer;

f) generating a centroid for each of the C cells using the generated spectral representation of each of the N frames to form a codebook for the ith word;

g) repeating steps a) through f) for each of the remaining u vocabulary words;

h) combining each centroid in the kth cell in the ith codebook to form a single cell in a single codebook; and i) repeating step h) for each of the remaining C cells to form the single codebook with C cells for each of the u vocabulary words.

22. The method of claim 21, wherein s equals 7, and u equals 100, and C equals 16.

23. The method of claim 16 wherein the single codebook is a fuzzy matrix quantized codebook, and the u hidden Markov models are trained with a fuzzy Viterbi algorithm.

24. The method of claim 16 wherein the step of generating a respective response by the designed single codebook comprises the steps of:

computing a relative closeness index between each codeword entry in the single codebook and a representation of the speech input signal; and grouping each relative closeness index into an observation sequence response.

25. The method of claim 16 wherein each of the speech input signals is represented by P order line spectral pair coefficients.

26. The method of claim 16 wherein s equals nine, u equals 26, and C equals 32.

27. The method as in claim 16 wherein u is greater than one.

28. A method comprising the steps of:

designing a single codebook having a vocabulary of u words, each word being represented by codewords designed with test speech input signals corrupted by s signal to noise ratios, where u and s are non-negative integers;

generating a respective response by the designed single codebook to each of the test speech input signals corrupted by the s signal to noise ratios;

training a hidden Markov model for each of the u words with each of the responses generated by the single codebook;

for each test speech input signal, determining a respective probability for each of the hidden Markov models to classify the test speech input signal; and training a neural network to recognize the speech input signal using each respective probability for each of the hidden Markov models.

29. The method as in claim 28 wherein s equals 7 and u is greater than one.

* * * * *